April 24, 1956 — C. I. MILLER — 2,742,800

ADJUSTABLE BORING CUTTER

Filed Jan. 26, 1953

INVENTOR
CARL I. MILLER
By
ATTORNEY

United States Patent Office 2,742,800
Patented Apr. 24, 1956

2,742,800

ADJUSTABLE BORING CUTTER

Carl L. Miller, Big Rapids, Mich., assignor, by mesne assignments, to Madison Manufacturing Company, Muskegon, Mich., a corporation of Michigan Application January 26, 1953, Serial No. 333,103

1 Claim. (Cl. 77—58)

This invention relates to the construction of boring cutters, and provides an improvement on the device shown and described in the H. L. Steiner Patent Number 2,408,-891, dated October 8, 1946, and over the George Madison Patent Number 1,118,141, dated November 4, 1914. Boring cutters of the type discussed herein are usually used in conjunction with a lathe or a boring mill for the purpose of enlarging holes. Conventionally, the work piece is held in a rotating spindle and the boring cutter is mounted on a cantilever bar secured to the tail stock, a turret, or to some support fixed with respect to the frame of the machine, but this arrangement is reversed in some instances. Boring cutters formed as shown in the Madison and Steiner patents mentioned above are adapted to cut at opposite points on the diameter of the hole; and the adjustment of the cutting diameter is accomplished by forming each of the cutting edges on a separate blade member, these blade members being slidably mounted with respect to each other in a generally radial direction from the axis of the boring bar. The adjustment of this cutting diameter through manipulation of the relative position of the blade members is a rather delicate operation, and both the Madison and Steiner patents illustrate the use of a screw engaging a threaded hole fixed with respect to one member and bearing on its end against the other member to induce changes in the relative positioning of the blades. The present invention presents an improvement in the adjusting mechanism, this improvement permitting the screw to induce movement both in the direction to increase and also to decrease the cutting diameter, and also resulting in a construction having reduced costs. The present invention presents a further desirable advantage over the arrangements shown in the Steiner and Madison patents. The adjusting screw can be placed opposite the center of the keyway without shortening the length of engagement of the keyway.

The several features of the present invention will be analysed in detail through a discussion of the particular embodiments illustrated in the accompanying drawing. In the drawing, Figure 1 is a sectional view of one form of cutter embodying the present invention, the section plane being taken approximately perpendicular to the cutting edges.

Figure 1:
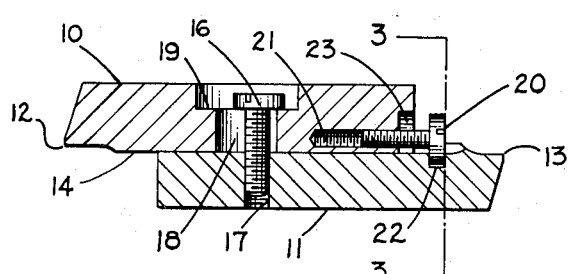
Figure 3:
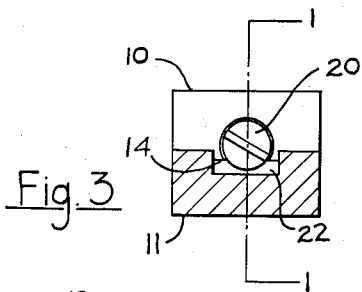
Figure 3 is a section taken on the plane 3—3 of Figure 1.
Figure 2:
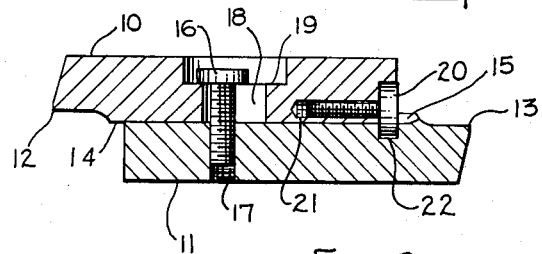
Figure 2 is a section through the same mechanism illustrated in Figure 1, at the opposite end of adjustment from that shown in Figure 1.

Referring to Figures 1, 2, and 3, the adjustable boring cutter includes the blade members 10 and 11 which are slidably mounted with respect to each other. To limit the sliding movement to a direction perpendicular to the cutting edges 12 and 13, the blade member 10 is formed with a tongue 14 and the blade member 11 with a groove or keyway 15 for cooperation therewith. The blade members 10 and 11 are held in the assembled position shown by the action of the securing screw 16 which engages the threaded hole 17 in the blade member 11. The screw 16 projects through a slot 18 in the blade member 10, and the head of the screw 16 bears against the shoulder 19 provided by a recess in the blade member 10.

The adjustment of the relative position of the blade members 10 and 11 so as to increase or decrease the distance between the cutting edges 12 and 13 is accomplished by the manipulation of the adjusting screw 20, which operates in threaded engagement with the hole 21 in the blade member 10. The hole 21 is arranged in a plane perpendicular to the cutting edges 12 and 13, and is also disposed between the planes defining the walls of the tongue 14 and groove 15. This arrangement is the preferable position for the screw 20, since the force applied to move the blade members should preferably be as close as possible to the axis of the tongue and groove system in order to minimize a tendency of the unit to jam. It will also be noted that the hole 21 is formed in the area adjacent the tongue 14; and that this feature permits the axis of the screw to be placed much closer to the plane of engagement of the blade members 10 and 11. This latter construction is particularly advantageous in view of the fact that the head of the screw 20 engages a recess 22 in the bottom of the groove 15. The lowering of the axis of the screw 20 will permit the walls of the recess 22 to engage the screw at a point nearer to the screw axis and thereby minimize the tendency to apply an upsetting moment to the screw during the process of adjustment. The presence of a counterbore 23 in the end of the blade member 10 permits the screw 20 to be positioned nearer to the center of the entire cutter without limiting the length of engagement of the tongue-and-groove keyway system. Reference to Figure 3 will indicate the manner in which the diameter of the counterbore 23 can be selected so that the sides of the tongue 14 continue on either side past the counterbore.

Figure 4:
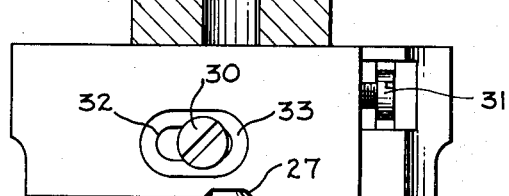
Figure 4 is a view showing the installation of a modified form of boring cutter in the end of a boring bar, with a portion of the end of the boring bar broken away.

Referring to Figure 4, a boring bar 24 is shown which provides a diametral recess 25 adjacent its end to receive an adjustable boring cutter assembly. Preferably, the unit is provided with the centering system including the pin 26 engaging suitable notches 27 in the cutter, and including a lock screw 28 for fixing the position of the pin 26. The screw 29 operates against a suitable bevelled surface (not shown) on the end of the pin 26 to urge the pin into engagement with the notches 27. This arrangement is shown, described, and claimed in the Steiner patent referred to above.

Figure 5:
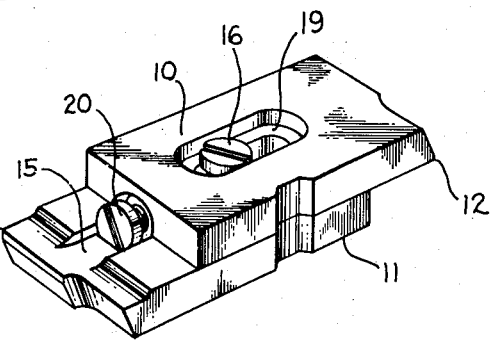
Figure 5 shows a perspective view of the cutter shown in Figures 1, 2, and 3.

The cutter shown in Figure 4 differs primarily from that shown in Figures 1 to 3, inclusive, in the displacement of the securing screw 30 from the axis of the adjusting screw 31. In cases where the length between the cutting edges is relatively short, it is preferable to displace the holding and adjusting screws in this manner. This arrangement is particularly advantageous when the threaded hole engaged by the screw 31 (and also the counterbore receiving the head of the screw 31) would approach the slot 32 or the recess 33. In units short enough where this is likely to occur, the arrangement of Figure 4 is definitely preferable to that shown in Figures 1 to 3. Figure 5 shows a perspective view of the cutter shown in Figures 1 to 3, and can be easily compared for arrangement with that shown in Figure 4.

The particular embodiments of the present invention which have been illustrated and discussed herein are for illustrative purposes only and are not to be considered as a limitation upon the scope of the appended claim. In this claim, it is my intent to claim the entire invention disclosed herein, except as I am limited by the prior art.

I claim:

A boring cutter comprising a pair of longitudinally adjustable blades having an interfitting tongue and groove respectively, one of said blades containing a counterbore and a threaded opening parallel to and lying within the walls defining said tongue, a screw received in said opening having an enlarged head overlying one wall of said tongue and adapted to occupy said counterbore, the other blade containing a transverse arcuate recess perpendicular to said groove receiving the overlying portion of said screw head, whereby adjustment of said screw produces relative movement of said blades, and securing means for maintaining said blades in an adjusted position.

References Cited in the file of this patent

UNITED STATES PATENTS

| 1,118,141 | Madison | Nov. 24, 1914 |
| 2,253,028 | Hassig | Aug. 19, 1941 |

FOREIGN PATENTS

| 7,598 | Great Britain | Apr. 13, 1901 |